April 2, 1940.  D. E. ROSS ET AL  2,195,683
BLOCK AND TILE PRESSING MACHINE
Filed Jan. 28, 1937  5 Sheets-Sheet 3
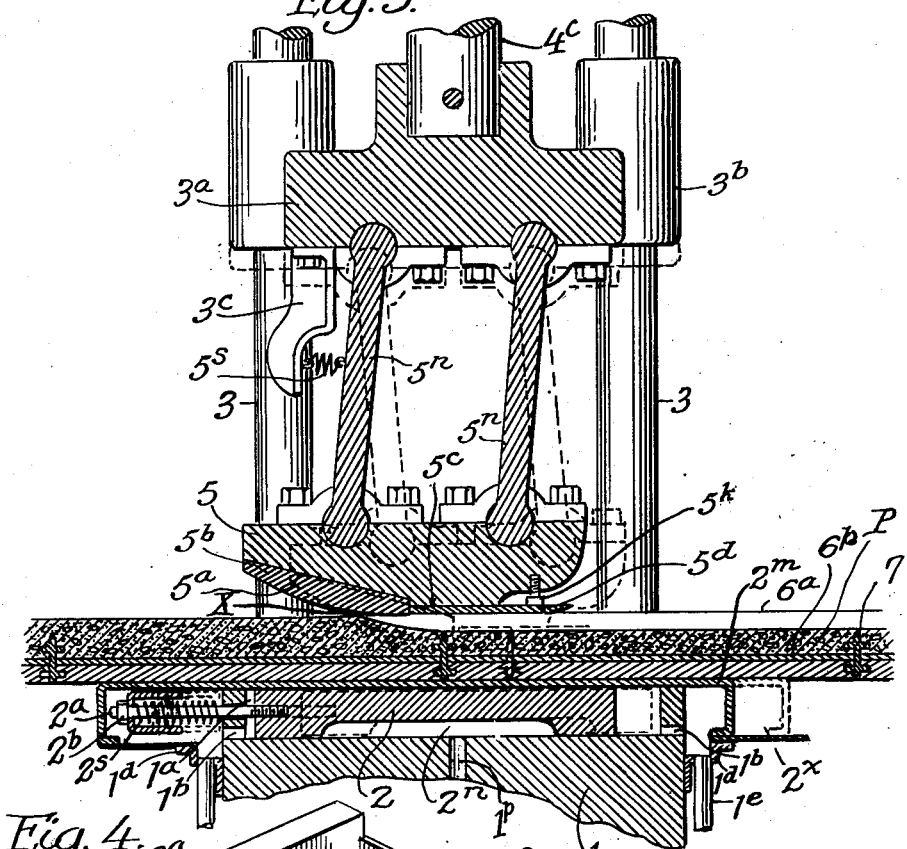
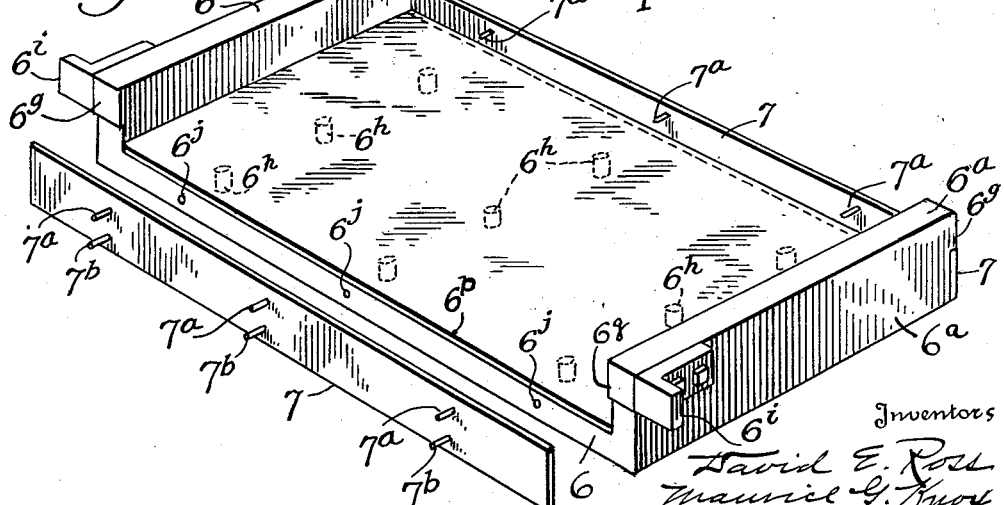
Inventors
David E. Ross
Maurice G. Knoy
and Floyd P. Wynn
By Alexander D. Powell
Attorneys April 2, 1940.                D. E. ROSS ET AL                2,195,683
                        BLOCK AND TILE PRESSING MACHINE
                    Filed Jan. 28, 1937        5 Sheets-Sheet 4
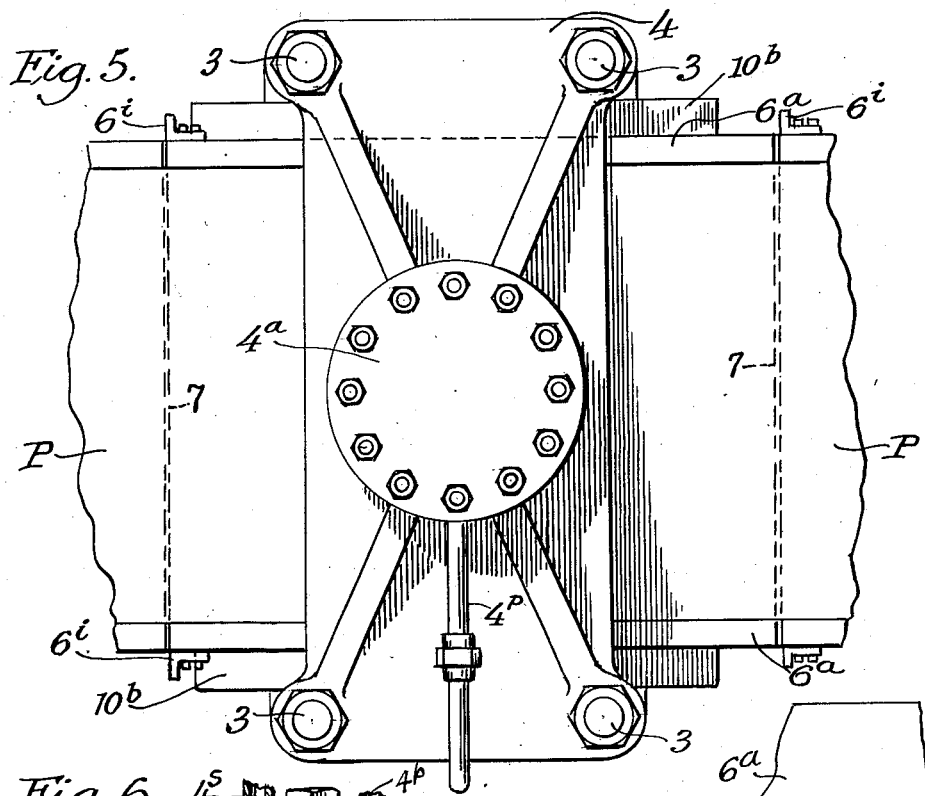
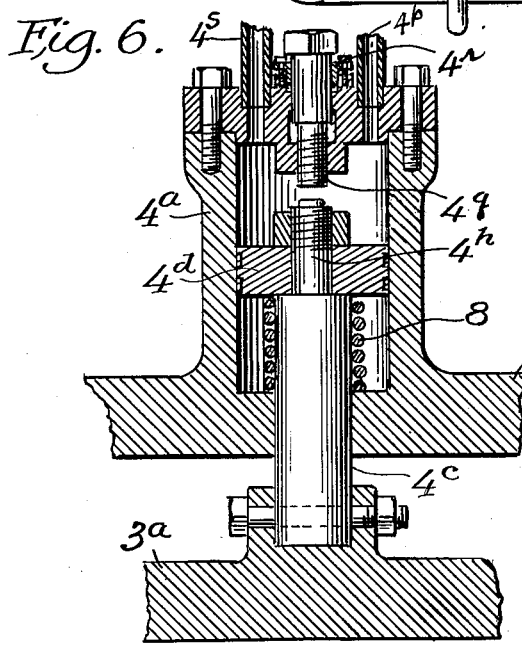
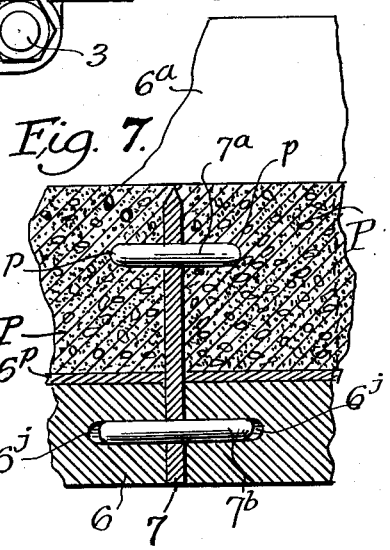

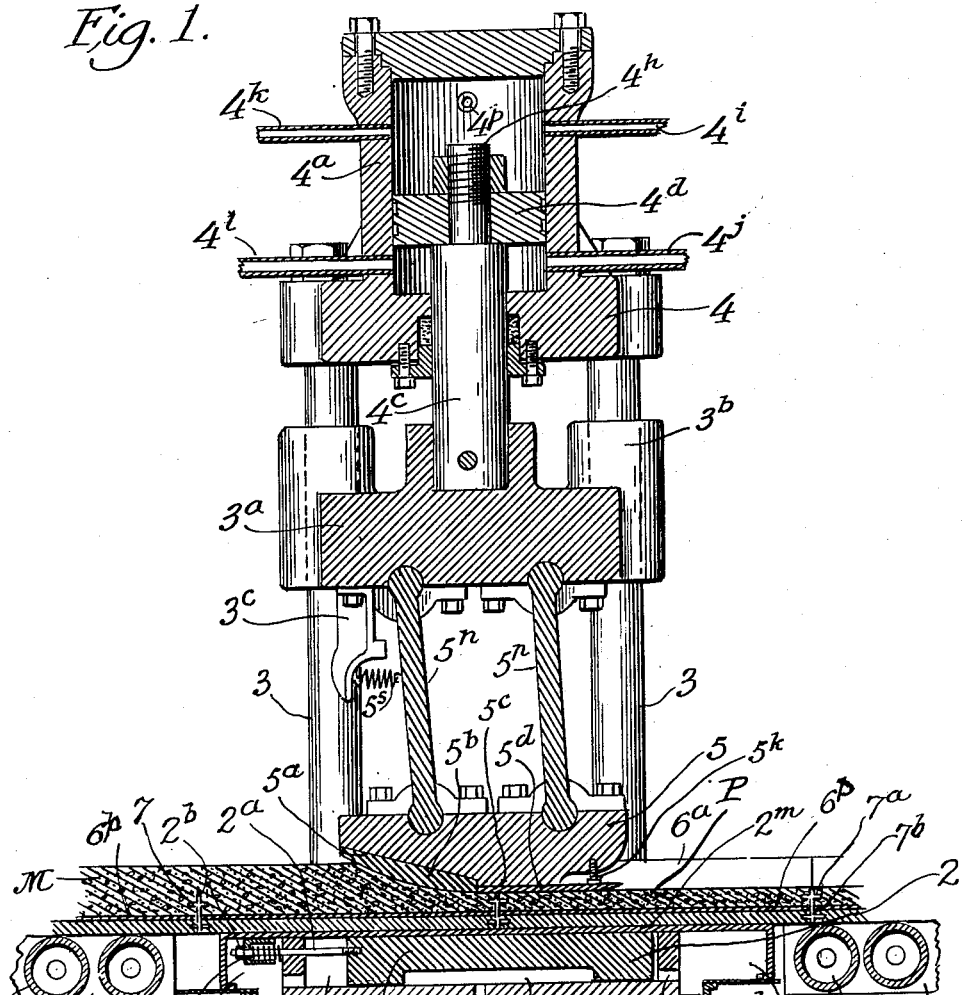

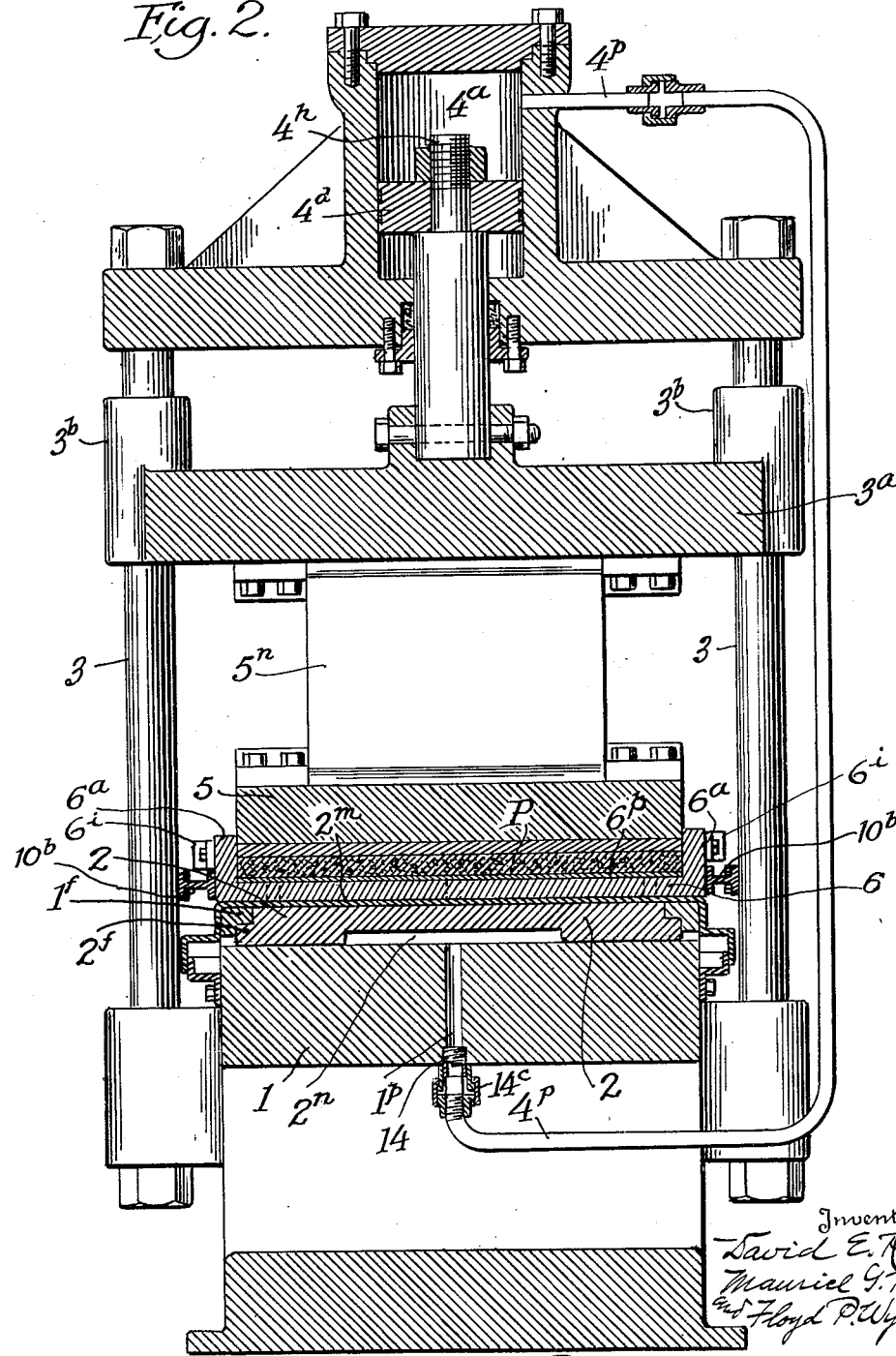

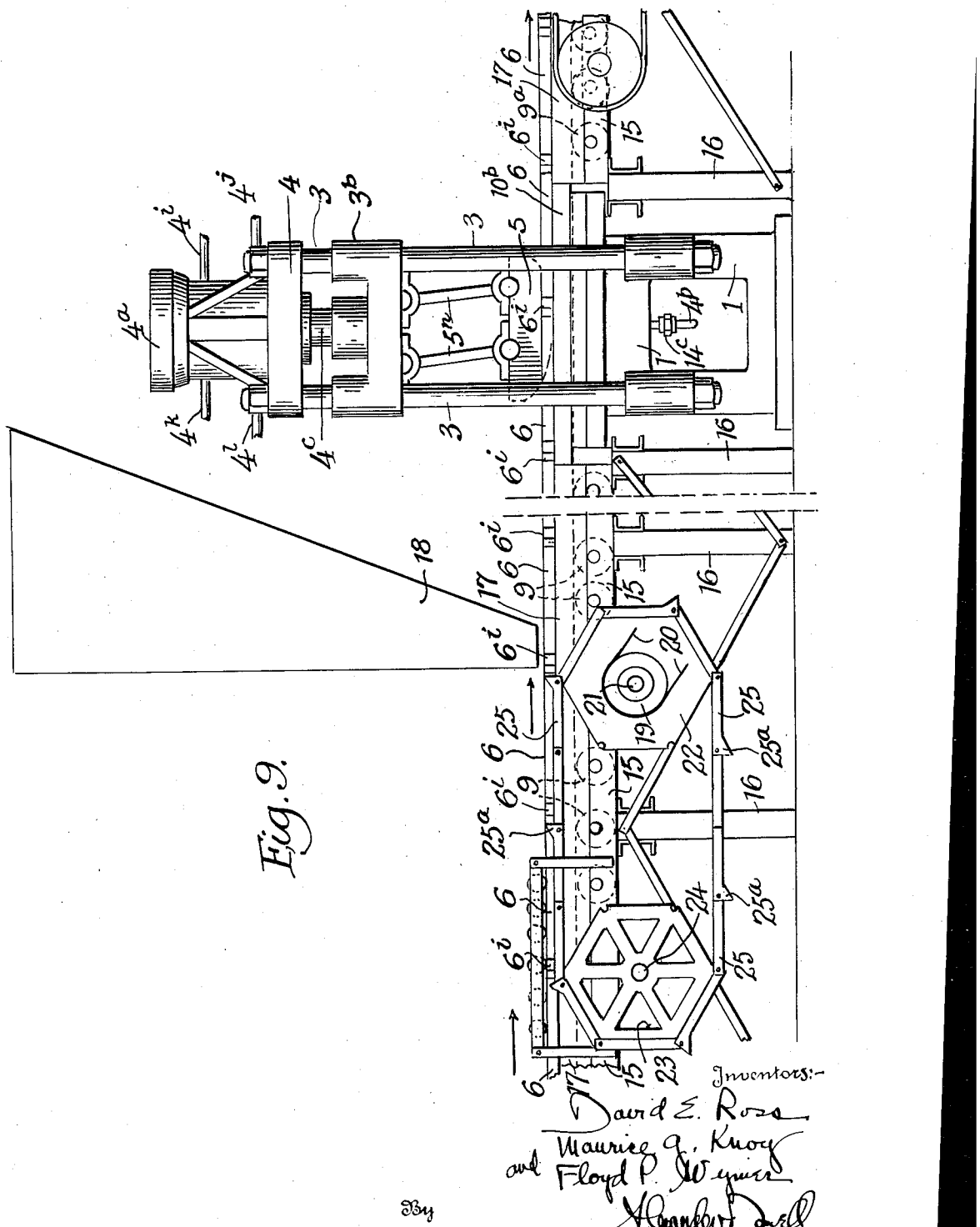

Patented Apr. 2, 1940

2,195,683

UNITED STATES PATENT OFFICE 2,195,683

BLOCK AND TILE PRESSING MACHINE

David E. Ross, Maurice G. Knoy, and Floyd P. Wymer, La Fayette, Ind., assignors to Rostone, Incorporated, La Fayette, Ind., a corporation of Indiana Application January 28, 1937, Serial No. 122,868

32 Claims. (Cl. 25—99)

This invention is a novel improvement in machines for pressing plastic or semi-plastic materials, and more particularly to machines in which the material is contained in molds during the pressing operation.

In our invention we use high unit pressure, preferably hydraulic, and press successive increments of the material to avoid the necessity of making the tremendous machine which would be necessary to press a large area of material at one time.

In our machine molds or containers are filled with material to be compressed, and moved successively and continuously to the pressing mechanism, and during each pressing operation of the material the mold is moved on, and when all the material therein has been compressed by successive operation of the presser head and the mold is ultimately discharged from the pressing mechanism, and the pressed product could be removed therefrom while material in a following mold is being pressed; and the pressing cycles are repeated continuously and are not delayed by the feeding of the molds or ejection of the pressed product.

The accompanying drawings illustrate one practical machine embodying our invention, and we will explain the invention with reference to said drawings, and summarize in the claims the novel features of construction and novel combinations of parts for which protection is desired.

In said drawings:

Fig. 1 is a vertical section of a machine embodying the invention in a plane parallel with the line of travel of the molds.

Fig. 2 is a vertical section of the machine taken in a plane at right angles to that shown in Fig. 1.

Fig. 3 is a detail section showing various positions of the presser head in one cycle of operations.

Fig. 4 is a view of one of the molds and spacers detached.

Fig. 5 is a plan view of the machine, Fig. 1.

Fig. 6 is a vertical sectional view of the pressure cylinder and connections illustrating modifications thereof.

Figs. 7 and 8 are detail sectional views.

Fig. 9 is a partial elevation of the machine showing one form of the mold feeding and filling mechanism associated with the pressing mechanism.

The machine shown has a base 1 which is provided with a recess 1a in its upper end in which is mounted a floating bed plate 2. This plate is capable of a limited longitudinal movement in the recess 1a and is normally retracted to the left (Fig. 2) by a rod 2a engaged by a spring 2s interposed between a nut 2b on rod 2a and the end wall of the base exterior to recess 1a. The bed plate 2 may be provided with side flanges 2f (Fig. 2) which underlie flanges 1f at the sides of recess 1a and whereby upward movement of the bed plate is limited. The recess 1a may be closed by a shield or top plate 2m which overlies plate 2 and projects at opposite sides of the base, and its ends and sides are bent down as shown in Figs. 1 and 2, and have a sliding engagement with bracket members 1d attached to the sides of the base. The space enclosed by the ends of the plate 2m and brackets 1d form a chamber 2x, exterior to the recess 1a, which is closed at its bottom but communicates with the recess 1a by bores 1b. The brackets 1d form channels in the bottom of chamber 2x and are provided with drain pipes 1e.

Rising from the base 1 are standards 3 on the upper ends of which is fixedly supported a casting 4 in which is a cylinder 4a enclosing a piston 4d to which is attached a rod 4c, and the lower end of the rod is attached to a cross-head 3a slidably guided between the uprights 3. The upward stroke of the piston is limited by a threaded extension 4h of the piston rod 4c passing through the piston 4d and carrying a nut which clamps the piston on the rod.

In Fig. 1 the cylinder 4a is shown as provided with upper and lower inlet pipes 4i, 4j; and upper and lower outlet pipes 4k and 4l. The inlet pipes are connected with a source of fluid under pressure (not shown); and the inlet and outlet of fluid is controllable by valves (not shown) so that the piston may be raised or lowered at will, by properly admitting or exhausting fluid from the cylinder. The upper end of the cylinder 4a is connected by a pipe 4p to a bore 1p in the base 1, which bore connects with the chamber formed by the recess 2n in the underside of the bed plate 2.

A presser head 5 is connected to the cross-head 3a by parallel-motion links 5n, in such a manner that said head is capable of a limited longitudinal movement relative to the base (Figs. 1 and 3). The head and links are normally swung to the left when in raised position by means of a spring 5s connected to one of the links and to a bracket 3c depending from the cross-head 3a. The presser head 5 is provided at its left hand end with an upwardly inclined portion 5a which may be provided with a hard metal shoe 5b, the lower surface of which is slightly convexed as in Figs. 1 and 3; and to the right (Figs. 1 and 3) of this shoe the presser-head is provided with a flat lower surface portion 5c, which may be faced with a hard metal plate 5d. The rear end of the plate 5d can be adjusted by means of set screws 5k (see Figs. 1 and 3) so that objectionable ridges or depressions will not be formed in the pressed material at the points where the successive pressing operations overlap; also as shown, the lower face of the rear end of plate 5d has a slightly upward curve for the same purpose.

The material to be pressed is placed in molds or containers 6 (Fig. 4) which are provided with side flanges 6a, the distance between the flanges corresponding to the desired length of the pressed product, and to the width of the presser head 5 (see Fig. 2), while the length of the flanges 6a corresponds with the desired width of the pressed product. The molds are adapted to be successively and continuously moved endwise under the presser head 5, and over the bed plate 2, the molds 6 being guided in their passage under the presser head 5 by means of rails 10b or the like (Fig. 2) secured to the standards 3 by bolts or the like, the rails 10b slidably engaging the outer faces of flanges 6a of the molds adjacent their lower ends. They may be moved to the press from left to right (Fig. 1) over rollers 9 and away from the press over rollers 9a (Fig. 1). At the infeed side we provide a sufficient number of rollers 9 or supports to enable a plurality of molds 6 to be arranged end to end and filled with material to be compressed and pushed forward successively and continuously beneath the presser-head 5; the molds containing the pressed material being ejected by the incoming molds filled with non-compressed material.

Fig. 4 shows one of the molds detached. Within this mold is a snugly fitting pallet 6p covering holes 6h in the bottom of mold 6. The holes 6h permit ejector pins (not shown) to be inserted for removal of the product from the mold 6 after it has passed out of the machine. Mold 6 is provided with lugs 6i on its sides which can be engaged by suitable propulsion means, hereinafter described, to impart horizontal motion to the mold train. Successive molds are separated by thin dividing plates 7 (as the containers are pushed through the press). The height of the divider plate 7 is approximately equal to the thickness of the pressed product P. A divider plate 7 is shown in place at the far end of mold 6 in Fig. 4, and at the near end is shown a divider plate 7 in perspective as it would be detached from mold 6 to allow the removal of the product from the mold by ejection as previously mentioned. Plates 7 (see Figs. 4 and 7) carry a lower set of dowels 7b which accurately locate its relation to the molds 6 by engaging aligned holes 6j in the adjacent ends of the molds. The dowels 7b also hold the molds in line during their movements to and under the presser head 5. Plates 7 also carry an upper set of dowels 1a which form pin-receiving holes p in the ends of the product being pressed (see Fig. 7), which holes p being disposed in the ends of the pressed product are convenient for erection purposes. The dividing plates 7 are removed from the pressed product P as the molds are separated. The divider plates 7 are of such heighth that their upper ends will be disposed even with or slightly below the upper surfaces of the pressed products, as shown in Fig. 7, whereby same will not interfere with the pressing operations of the head 5 and plate 2. Any small fins left above the top of the divider plates 7 are not objectionable since same can be removed by a number of common methods either while the product is still uncured or may be removed after curing. Also as shown in Fig. 4, the upper portions of the ends of flanges 6a of the molds, i. e. the portions above the tops of divider plates 7 are projected outwardly as at 6q a distance equal to about half of the thickness of the divider plates so as to seal the divider plates 7 between adjacent molds, and the flanges of propulsion lugs 6i are preferably flush with the outer ends of the projections.

The molds 6, of area and shape to conform with the final shape of the product, are filled with the material to be pressed, and placed end to end, and moved successively and continuously into position between guide rails 10b and over bed plate 2 and beneath the presser-head 5, and since both the bed plate and presser-head can move horizontally, the material is pressed in increments; also in order to successfully accomplish high-pressure pressing in this manner, the bed plate is arranged to float while the molds are being pressed, the floating being accomplished in the following manner.

As shown in Figs. 1 and 2, the pressure in cylinder 4a is transmitted through a pipe 4p to the chamber 2n below bed plate 2. In the pipe 4p may be provided any suitable throttling device 14. The chamber 2n of bed plate 2 has more exposed surface than the piston 4d, and as the down pressure on the piston is transmitted through the pipe 4p the plate 2 is pushed up by and rides upon a film of fluid or oil (supplied from cylinder 4a), while the material is being pressed. On the upstroke of the piston 4d the plate 2 is returned to the left by spring 2s after the pressure in recess 2n is released.

The instant pressure in chamber 2n of bed plate 2 begins to rise, a film of oil or fluid is caused to flow out beneath plate 2 into chamber 1a so that the plate in fact rides upon said fluid, dispensing with metal to metal contact while under pressure. When this fluid flow starts the pipe 4p being throttled will not deliver fluid fast enough to raise bed plate 2 an appreciable amount, nor will the pressure in cylinder 4a be lowered, as leakage due to the film is very slight.

In the drawings (Fig. 8), we have shown the throttle as a short externally threaded pipe member 14 screwed into the lower end of the bore 1p and connected by an ordinary pipe coupling 14c, to pipe 4p. The throttle 14 has a bore 14a which is of such diameter as will ensure the correct counter-balance or flow of fluid from the cylinder 4a to and under the bed plate 2; so that just as the bed plate is unseated due to the hydraulic pressure beneath it, the escape of fluid from beneath the plate will be sufficient to allow the bed plate to be depressed very slightly under pressure of the head 5. The actual amount of the raising and lowering movements of the bed plate are very small, and the fluid escapes from under the plate in a slight film. The throttle 14 may be removed and substituted by another having a different size of bore 14a, until the correct size is found which will allow proper fluid flow and the desired balance of pressure obtained. In some cases a throttling valve could be used in place of said throttle pipe 14, such valve being adjusted until the correct setting has been obtained, and then fixed at such adjustment. By the construction described, we obtain a complete balance of the pressure between the piston 4d and the bed plate 2 due to the slightly larger surface area of the recess 2n in plate 2 over the upper surface of the piston 4d; and high friction metal-to-metal bearing pressures are avoided.

The parallel-motion links 5n allow the head 5 to swing and move horizontally with the material on the down stroke; and on the upstroke of the head it is yieldably returned to its original position by spring 5s. The parallel-motion links 5n are so arranged that as piston 4d pushes head 5 downwardly, an increment of material in the underlying mold 6 receives maximum pressure.

The head 5 is so shaped and hung that on the down stroke shoe 5b pre-presses and gradually forces the air out of the loose material prior to receiving the subsequent final high pressure exerted on the same portion of the material by the lowest part 5d of the head at the next pressing operation.

Instead of using fluid pressure through pipe 4d to raise the piston 4d and presser-head 5, they might be returned quickly by spring means. For example a spring 8 (Fig. 6) could be used; also as indicated in Fig. 6, fluid might be admitted into the cylinder above the piston and exhausted therefrom through a pipe 4s connected with a fluid pressure supply having a suitable control valve. Also the pressure conducting pipe 4p might be connected to the top of the cylinder as shown in Fig. 6 instead of to the side thereof as in Fig. 2. In this modification, the upward stroke of the piston 4d is limited by an adjustable stop which as shown comprises a bolt 4q threaded through the top of the cylinder 4a and provided with a packing gland 4r.

In operation, in Fig. 3, the various parts are shown in full lines at the beginning of the down stroke, and the shiftable parts are shown in dotted lines at the end of the down stroke. At the beginning of the down stroke the presser-head 5 is forced downwardly and contacts the loose material to be pressed at point X (which is the upper extremity of the depression in the material in the mold formed by the last preceding pressing operation), and during the pressing the head moves forward horizontally (to the right in Fig. 3) placing spring 5s under tension, the head being also moved downwardly to the final position shown in dotted lines in Fig. 3. The downward movement of the presser-head 5 is brought about by the downward movement of cross-head 3a, acting through the parallel links 5n. The horizontal movement of the presser-head 5 is brought about by friction of the plastic material in the molds 6 on head 5 as the molds are moved horizontally during the pressing operation. The presser head 5 is quickly retracted from pressing position so that there is no dragging or accumulation of unpressed material under the presser-head shoe 5a.

Simultaneously, as downward pressure increases on head 5, the bed plate 2 is unseated by reason of the sub-acting balanced hydraulic pressure explained above, and (being restrained only by spring 2s) the bed plate 2 and its dust guard 2m move horizontally to the position indicated by the dotted lines in Fig. 3, thereby compressing spring 2s. This horizontal motion is brought about by the frictional contact between the bed plate 2, dust guard 2m and the bottoms of the molds 6, since the molds are moving continuously, horizontally, beneath the presser-head 5. The presser head 5 and bed plate 2 become in effect the opposing jaws of a closing vise which grip the mold 6 and its contents for a brief period, and this vise, being free to move horizontally, is carried along with the moving molds until the point at which pressure is released; that is, the end of the down stroke of the head. For purposes of clarity, the vertical movement (Fig. 3) of the bed plate 2 has been exaggerated. The bed plate 2 and its dust guard 2m may be interconnected, since the aforesaid vertical movement of the bed is limited to a very few thousandths of an inch, and the resulting distortion of the guard would be negligible.

At the instant of pressure release, which occurs at the end of the down stroke, there is an upward movement of cross-head 3a, and presser head 5 is jerked upwardly to clear the material P in the molds. Once free, springs 5s return the presser head 5 to its initial point, and similarly base plate 2 is restored by spring 2s. With the moving parts thus returned, and a new area of mold surface shifted into position, the cycle is repeated.

In Fig. 9, frame members 15 mounted on uprights 16 support the series of rollers 9 and 9a, which with side guides 17 form a track along which molds 6 are pushed in the direction indicated by the arrow, same passing under a feeding hopper 18, and thence through the press over the bed plate and under presser-head 5. After passing through the press they are pulled apart mechanically. Molds of the character shown and described can be easily separated and dismantled after the pressing operations. After the molds 6 are dismantled, cleaned, and reassembled, the molds are returned to the pressing line and are manually entered into the path of the propulsion mechanism to repeat the cycle.

The propulsion mechanism (Fig. 9) consists of a pulley 19 connected by belt 20 to a source of power (not shown). Pulley 19 is mounted on shaft 21 disposed under the track and journaled in bearings mounted on frame members 15. Shaft 21 carries two hexagonally shaped sprocket wheels 22, one mounted at each side of the track. Similarly, sprocket wheels 23 are carried by a second parallel shaft 24. Sprocket wheels 22 and 23 are interconnected by endless chains of links 25 disposed at each side of the track. Links 25 have large heads forming lugs 25a, which pick up the molds 6 as inserted by means of the propulsion lugs 6i on the molds 6, and force the mold train to move towards the right (Fig. 9) and through the press. The distance between lugs 25a of the endless chain is slightly less than the distance between propulsion lugs 6i on adjacent molds 6. In this manner the pushing is always done on the first mold of the train, and lugs 6i are afforded release from lugs 25a without jerking when the latter change their direction in passing around sprocket 22. After passing through the press, the molds 6 are pulled apart by another mechanism (not shown).

Our construction avoids high friction between the bed plate 2 and the base 1 during the pressing operations, by providing fluid pressure under the bed plate sufficient to form a film which prevents frictional contact of the metal of the bed plate with the metal of the base. While the bed plate practically rides upon a thin film of fluid during the actual pressure operation, the fluid pressure on the bed plate and the pressure upon the presser head are so relatively adjusted that they practically balance during the pressing operation; and the pressure on the material in successive compression operations is therefore uniform.

By the above construction, we are able to compress plastic or semi-plastic material by moving the same in a continuous web at a substantially constant speed, while applying presusre at a pressure station in said moving web, the station shifting with the web while pressure is being applied, and retracting to normal position when pressure is relieved, thereby effecting compression of the web by successive increments.

We claim:

1. In a pressing machine of the character specified; a longitudinally movable bed plate, a support therefor; a reciprocable and longitudinally movable presser head cooperating with said plate to compress material, means for moving material to be pressed between the presser head and bed plate; said presser head and bed plate being moved by the material in the direction of travel of the material during the pressing operation; and means for moving the presser head and bed plate in a direction opposite to the direction of movement of the material in the interval between pressing operations.

2. In mechanism as set forth in claim 1, means for admitting fluid under pressure between the bed plate and support during the pressure operation.

3. In mechanism as set forth in claim 1, fluid pressure means for moving the presser head towards the bed plate during the compression stroke thereof, and means for admitting fluid under pressure between the bed plate and support during the pressure operation.

4. In mechanism as set forth in claim 1, a fluid pressure cylinder, a piston therein, and connections between the piston and presser head for operating the latter during the down stroke; and means for conducting fluid pressure from the pressure side of the cylinder between the bed plate and support during the pressing operation.

5. In a machine set forth in claim 1, a recess under the bed plate opposite the support; a pressure supply duct communicating with this recess, and means for throttling the pressure transmitted to said recess.

6. In a machine as set forth in claim 1, a plurality of end to end molds adapted to receive the material to be pressed; and means on the molds engaging said moving means for moving the molds.

7. In a machine as set forth in claim 1, a mold track extending between the presser head and bed plate; a plurality of molds placed end to end in said track; and means on the molds engaging said moving means for continuously moving the molds.

8. In a machine as set forth in claim 1, a mold track extending between the presser head and bed plate; a plurality of molds placed end to end in said track; said moving means comprising propulsion means mounted adjacent the track; means for feeding material to the molds in advance of the presser head; and means on the molds engaging the propulsion means.

9. In a pressing machine of the character specified; the combination of a base, a longitudinally movable bed plate therein; a reciprocable and longitudinally movable presser head cooperating with said plate to compress material fed therebetween, means for moving material to be pressed between the presser head and bed plate during the pressing operation, the presser head and bed plate being movable in the direction of travel of the material during the pressing operation, means for moving the presser head in a direction contrary to the direction of movement of the material when the presser head is retracted from the pressing position, and means for moving the bed plate in the direction opposite to the direction of movement of the material in the interval between pressing operations.

10. In mechanism as set forth in claim 9, fluid pressure means for moving the presser head during the compression stroke thereof, and means for admitting fluid under pressure beneath the bed plate to prevent metal to metal contact between the bed plate and base during the pressure operation.

11. In mechanism as set forth in claim 9, fluid pressure means for moving the presser head during the compression stroke thereof, and means for admitting fluid under pressure beneath the bed plate to prevent metal to metal contact between the bed plate and base during the pressure operation, and means for throttling the fluid pressure in said admitting means.

12. In a machine as set forth in claim 9, a plurality of end to end molds adapted to receive the material to be pressed; and said moving means comprising means for moving the molds.

13. In a machine as set forth in claim 9, a mold track extending between the presser head and bed plate; a plurality of molds placed end to end in said track; and said moving means comprising means for continuously moving the molds.

14. In mechanism as set forth in claim 9, a fluid pressure cylinder, a piston therein, and connections between the piston and presser head for operating the latter during the down stroke; means for conducting fluid pressure from the pressure side of the cylinder to the underside of the bed plate during the pressing operation; and means for throttling the fluid pressure in said conducting means.

15. In a machine of the character specified having pressing operations, a base, a movable bed plate supported thereon, standards rising from said base, a cylinder supported on the upper end of said standards, a reciprocable cross-head operated by said cylinder and guided by said standards, a presser head below the cross-head, links connecting the presser head to the cross-head, and means for moving material between the presser head and bed plate, said presser head being movable in the direction of travel of the material during the pressing operation, and means for moving the presser head oppositely to the direction of travel of the material in the interval between pressing operations.

16. In mechanism as set forth in claim 15, the bed plate being movable in the direction of travel of the material during the pressing operation and means for moving same in the direction opposite to the travel of the material after each pressing operation.

17. In mechanism as set forth in claim 15, means whereby during each pressing operation of the presser head the bed plate is pressed toward the presser head by fluid pressure.

18. In a pressing machine of the character specified having pressing operations, a bed plate, and a reciprocable presser head cooperating with said plate to compress material moving between the plate and head, said presser head and plate being movable with the material being pressed during the pressing operation, and means for returning the presser head and the bed plate in a direction opposite to the travel of the material in the interval between pressing operations; a fluid pressure cylinder, a piston therein, and connections between the piston and presser head for operating the latter during the down stroke, and means for conducting fluid pressure from the pressure side of the cylinder to the underside of the bed plate during the pressing operation.

19. In a machine of the character set forth in claim 18, means for throttling the pressure transmitted to the underside of the bed.

20. In a machine for pressing material in successive operations, a reciprocable and longitudinally movable presser head, a longitudinally movable bed plate cooperating with said head; means for continuously moving material to be pressed between the presser head and bed plate; and means tending to urge the bed plate towards the presser head during the pressing operation; said presser head and bed plate being moved in the direction of travel of the material during the pressing operation.

21. In a machine as set forth in claim 20; and means for moving the presser head and bed plate in the direction opposite to the direction of movement of the material in the interval between pressing operations.

22. In a machine as set forth in claim 20, said head and bed plate being moved by frictional contact with the material during the pressing stroke.

23. In a machine as set forth in claim 20, said bed plate being reciprocable within limits, and said urging means rendering the longitudinal movement of the bed plate substantially frictionless.

24. In a machine as set forth in claim 20, means for varying the force of the urging means.

25. In a machine as set forth in claim 20, said bed plate being reciprocable within limits; and means for varying the force of the urging means.

26. In a machine as set forth in claim 20, a support for said bed plate, and said urging means creating pressure between the bed plate and support.

27. In a pressing machine adapted for successive pressing operations, a support, a bed plate on said support, a reciprocable presser head cooperating with the said plate to compress material moving between the plate and head; said head and plate being movable with the material being pressed during each pressing operation; means for returning the presser head and bed plate in a direction opposite to the travel of the material in the interval between pressing operations; a fluid pressure cylinder, a piston therein connected with the head for operating the latter; means for conducting fluid pressure to the underside of the bed plate during the pressing operation; and means for balancing the pressures between the bed plate and pressing head.

28. In a machine as set forth in claim 27, said means comprising a pipe connecting the cylinder with the underside of the bed plate.

29. In a machine as set forth in claim 27, said means comprising a pipe connecting the cylinder with the underside of the bed plate; and a throttle in said pipe.

30. In a machine as set forth in claim 27, said bed plate having a recess in its underside of larger area than the piston, and said means comprising a pipe connecting the cylinder with said recess.

31. In a machine as set forth in claim 27, said bed plate having a recess in its underside of larger area than the piston; said means comprising a pipe connecting the cylinder with said recess; and a throttle in said pipe.

32. In a pressing machine of the character specified; a longitudinally movable bed plate, a reciprocable and longitudinally movable presser head, a track for directing the material to be pressed between the presser head and bed plate; a train of molds movable along said track and carrying the material to be pressed; said presser head and bed plate cooperating with each other to press the material in the molds embraced therebetween while avoiding pressure on the track, and being moved by the material in the direction of travel of the material during the pressing operation, and means for moving the presser head and bed plate in a direction opposite to the movement of the material during the interval between pressing operations.

DAVID E. ROSS.
MAURICE G. KNOY.
FLOYD P. WYMER.